(12) United States Patent  
Glick et al.

(10) Patent No.: US 8,701,192 B1  
(45) Date of Patent: Apr. 15, 2014

(54) BEHAVIOR BASED SIGNATURES

(75) Inventors: Adam Glick, Culver City, CA (US); Spencer Dale Smith, El Segundo, CA (US); Nicholas Robert Graf, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 859 days.

(21) Appl. No.: 12/495,127

(22) Filed: Jun. 30, 2009

(51) Int. Cl.
G06F 21/00 (2013.01)

(52) U.S. Cl.
USPC .......................................................... 726/24

(58) Field of Classification Search
USPC .......................................................... 726/24
See application file for complete search history.

(56) References Cited

U.S. PATENT DOCUMENTS

| | | | |
|---|---|---|---|
| 2006/0075504 A1* | 4/2006 | Liu ................................. | 726/25 |
| 2009/0089040 A1* | 4/2009 | Monastyrsky et al. ......... | 703/26 |
| 2009/0158430 A1* | 6/2009 | Borders .......................... | 726/23 |
| 2010/0192223 A1* | 7/2010 | Ismael et al. .................... | 726/22 |

OTHER PUBLICATIONS

M. Harris, Behavioral Genotype Technology: A New Approach to Proactive Detection of New Malware,<www.infosectoday.com/Articles/Behavioral_Genotype.htm >, May 22, 2009, 2 pgs.

\* cited by examiner

*Primary Examiner* — William Goodchild
(74) *Attorney, Agent, or Firm* — Brill Law Office; Jeffrey Brill

(57) ABSTRACT

Behavior based signatures for identifying applications are generated. An application is monitored as it runs. Specific behaviors concerning the execution of the application are detected, and a behavior based signature representing detected behaviors is created, such that the behavior based signature can be used subsequently to identify instances of the application. Behavior based signatures identifying known malicious and/or non-malicious applications can be used to determine whether other applications comprise malware. To do so, a running application is monitored, and specific behaviors concerning the execution of the application are detected. The detected behaviors are compared to one or more behavior based signatures. Responsive to whether the detected behaviors match, a behavior based signature, it can be determined whether the application comprises malware. An additional malware detection test, such as a heuristic analysis, can also be performed and used in determining whether the application comprises malware.

20 Claims, 6 Drawing Sheets

BEHAVIOR BASED SIGNATURES

TECHNICAL FIELD

This disclosure pertains generally to computer security, and more specifically to generating behavior based signatures, and using behavior based signatures to identify malware.

BACKGROUND

Software exists to detect (and thus eliminate) malware (e.g., viruses, worms, Trojan horses, spyware, etc.). Such software typically works by using either static bit signatures and/or heuristics to identify malware. Static bit signature based malware detection involves identifying a specific bit-level pattern (signature) in known malware. Files are then scanned to determine whether they contain this signature. When malware is identified using static file signatures, the certainty of the conviction is high. However, signature based detection is easily circumvented by changing content. Signatures have become less and less useful, as malware authors have become more sophisticated at manipulating their malware to avoid signature based detection. For example, malware authors now commonly use techniques such as obfuscation and packing of files to change the contents without affecting the malicious functionality. Many malware authors have learned to obfuscate and/or pack the bits of their malicious files beyond the point at which signature based file scanning can effectively detect them. Once a signature is identified for an iteration of a given piece of malware, the file containing the malware is modified such that the signature can no longer identify it. As a result, a large number of ineffective malware signatures are in use.

Heuristic malware detection involves determining the likelihood of a given file being malware by applying various decision-based rules or weighing methods. Heuristic analysis can produce a useful result in many circumstances, but there is no mathematical proof of its correctness. In static file heuristics, the contents of the file is heuristically analyzed. In behavior based heuristics, the behavior of the program is heuristically analyzed. Both methods involve training a heuristic analyzer with a sample set of malware and clean files, so that it can make generalizations about the types of content or behaviors associated with each. Identifications of suspected malware using heuristic analysis can never, by definition, be highly certain, as heuristic analysis only determines a likelihood of a file being clean or malicious. The confidence in heuristic based file convictions further suffers from the fact the training set is difficult to define, and is always different than the real world set.

It would be desirable to address these issues.

SUMMARY

A behavior based signature system generates behavior based signatures for identifying applications. More specifically, the behavior based signature system monitors an application as it runs. In some embodiments, the behavior based signature system also monitors characteristics of the file storing the application. In some embodiments, the monitored application is a malicious application, whereas in others the monitored application is a non-malicious application. The behavior based signature system detects specific behaviors concerning the execution of the application. In some embodiments, one or more series of specific behaviors concerning the execution of the application is further detected. A behavior based signature representing detected behaviors concerning the execution of the application is created, such that the behavior based signature can be used subsequently to identify instances of the application. In embodiments in which characteristics of the file storing the application are monitored, the created behavior based signature can represent this information as well. In embodiments in which one or more series of specific behaviors concerning the execution of the application are detected, the created behavior based signature can represent the one or more detected series of specific behaviors. In some embodiments, a black-list of behavior based signatures and/or a white-list of behavior based signatures are also created.

A malware detecting module can use behavior based signatures to determine whether an application comprises malware. To do so, a running application is monitored, and specific behaviors concerning the execution of the application are detected. The malware detecting module compares detected behaviors concerning the execution of the application to one or more behavior based signatures (for example, those in a black-list and/or white-list). Responsive to whether the detected behaviors match a behavior based signature, the malware detecting module can determine whether or not the application comprises malware. In some embodiments, the malware detecting module performs at least one additional malware detection test, such as a heuristic analysis, on the application. In those embodiments, the malware detecting module determines whether the application comprises malware responsive to results of the comparing step and to the results of the additional malware detection test.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the subject matter, resort to the claims being necessary to determine such subject matter.

The Figures depict various embodiments for purposes of illustration only. One skilled in the art will readily recognize from the following discussion that other embodiments of the structures and methods illustrated herein may be employed without departing from the described principles.

DETAILED DESCRIPTION

Figure 1:
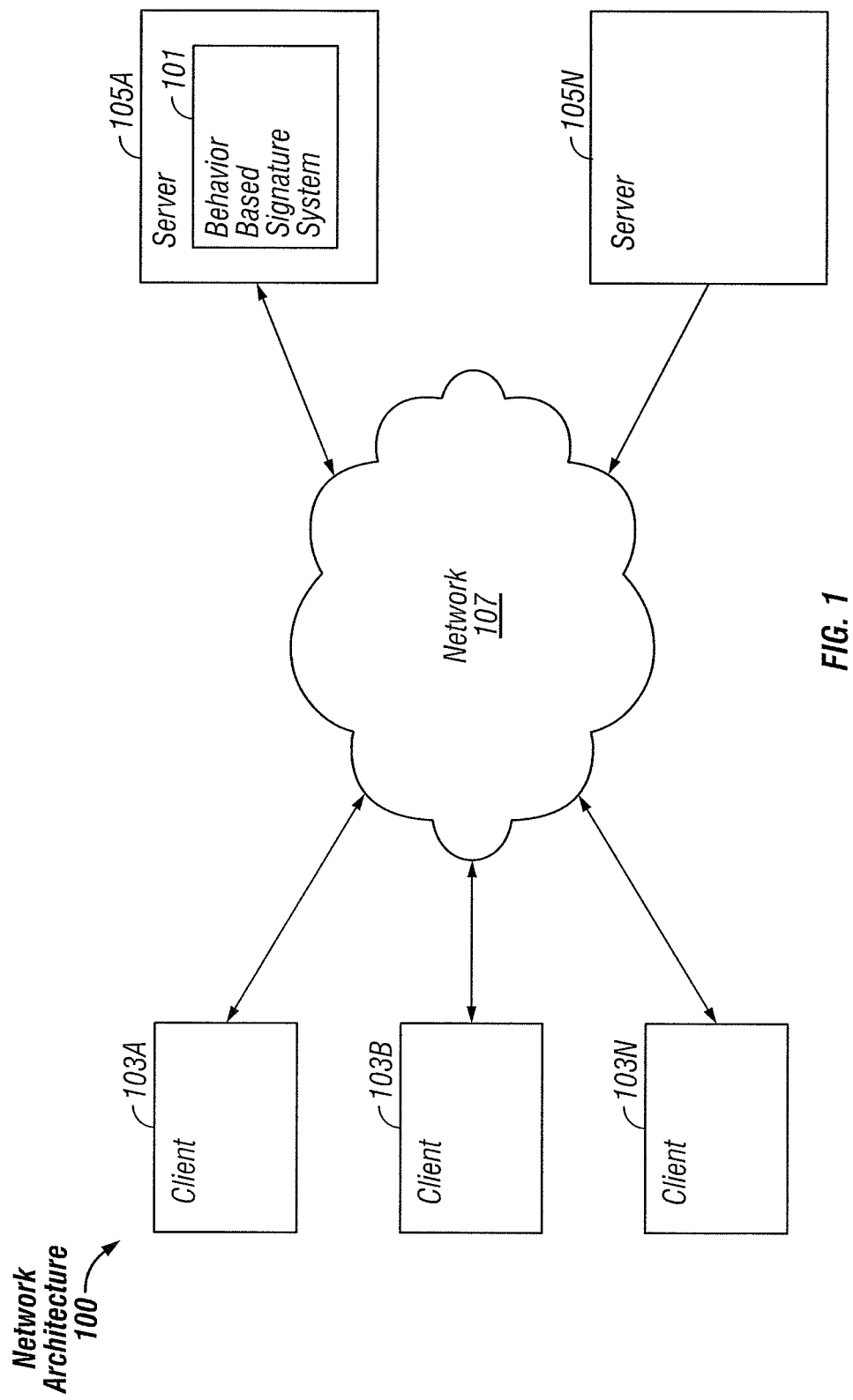
FIG. 1 is a block diagram of an exemplary network architecture in which a behavior based signature system can be implemented, according to some embodiments.

FIG. 1 is a block diagram illustrating an exemplary network architecture 100 in which a behavior based signature system 101 can be implemented. The illustrated network architecture 100 comprises multiple clients 103A, 103B and 103N, as well as multiple servers 105A and 105N. In FIG. 1, the behavior based signature system 101 is illustrated as residing on server 105A. It is to be understood that this is an example only, and in various embodiments this system 101 can be instantiated on a client 103, a server 105 or distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
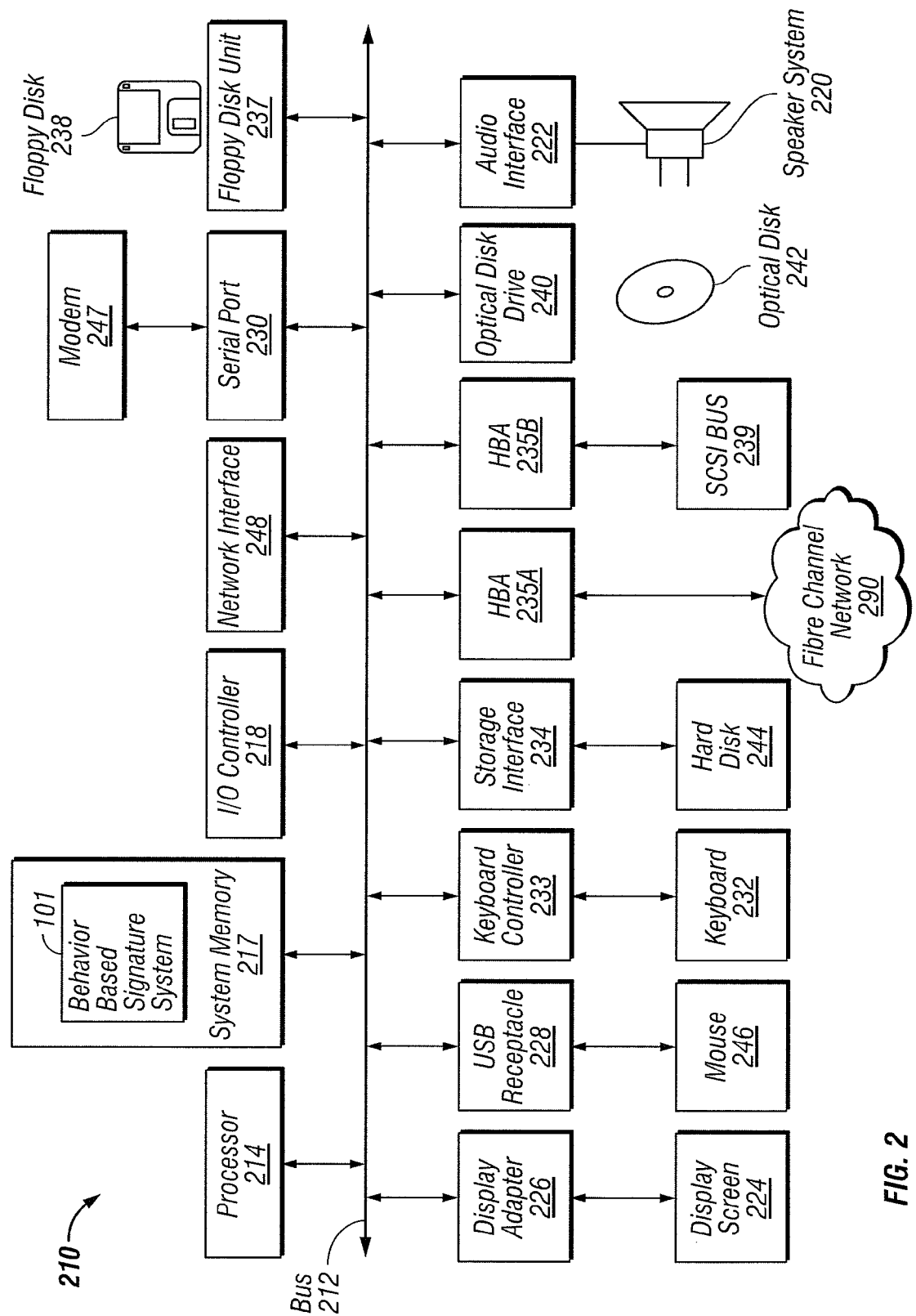
FIG. 2 is a block diagram of a computer system suitable for implementing a behavior based signature system, according to some embodiments.

FIG. 2 is a block diagram of a computer system 210 suitable for implementing a behavior based signature system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/ or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the behavior based signature system 101 is illustrated as residing in system memory 217. The workings of the behavior based signature system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
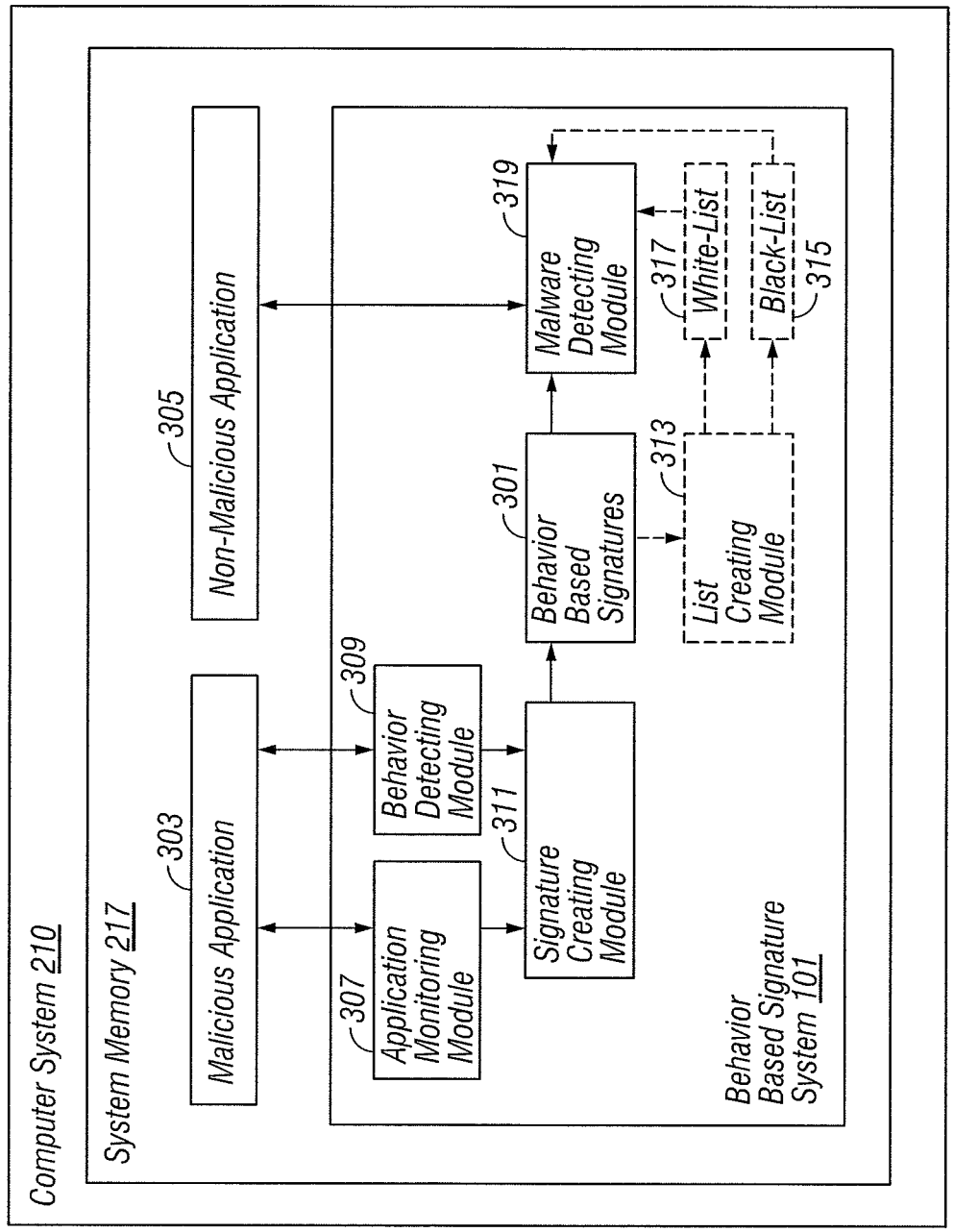
FIG. 3 is a block diagram of a behavior based signature system, according to some embodiments.

FIG. 3 illustrates a behavior based signature system 101, according to some embodiments. This behavior based signature system 101 is illustrated as residing on a computer system 210, which as described above can comprise a server 105 or a client 103. In some embodiments, the functionality of the behavior based signature system 101 is distributed between multiple computer systems 210, and/or provided as a service over a network 107 in a cloud based computing environment.

It is to be understood that although modules of the behavior based signature system 101 are illustrated in FIG. 3 as separate entities, the illustrated behavior based signature system 101 represents a collection of functionalities, which can be instantiated as fewer, more or overlapping modules as desired. It is to be understood that the modules of the behavior based signature system 101 can be instantiated (for example as object code or executable images) within the system memory 217 (e.g., RAM, ROM, flash memory) of a computer system 210, such that when the processor 214 of the computer system 210 processes a module, the computer system 210 executes the associated functionality. Additionally, program code to implement the functionalities of the behavior based signature system 101 can be stored on computer-readable storage media, such that the program code can be loaded from the computer-readable storage media into the system memory 217 of a computer system 210, and executed by the processor 214 of the computer system 210. Any form of tangible computer readable storage medium can be used in this context, such as magnetic or optical storage media. As used herein, the term "computer readable storage medium" does not mean an electrical signal separate from an underlying physical medium. As used herein, the terms "computer system," "computer," "client," "client computer," "server," "server computer" and "computing device" mean one or more computers configured and/or programmed to execute the described functionality.

As illustrated in FIG. 3, the behavior based signature system 101 generates behavior based signatures 301 identifying known malware 303. More specifically, signatures 301 are generated that identify malicious applications 303 by a combination of their behaviors. The behaviors of a malicious application 303 are much more difficult to modify or disguise than its bit-level file contents. In order to create a behavior based signature 301 identifying a malicious application 303, an application monitoring module 307 of the behavior based signature system 101 monitors the malicious application 303 as it runs. A behavior detecting module 309 detects specific behaviors that the malicious application 303 executes. As used herein, a behavior means an action performed when an application 303 runs, or specific information concerning such an action (i.e., parameters accepted, values returned, source, target, etc.). Examples of the types of behaviors the behavior detecting module 309 can detect are load points, network usage, protocols used, internet protocol (IP) addresses accessed, ports used, frequency, size and/or content of transmitted and/or received data, destination and/or source of same, frequency and/or targets of file system access/modifications, modifications of registry, modifications of critical system area(s) (e.g., registers such as BHO/LSP, etc.), access and/or modification of critical system files or directories (e.g., system32, windir, etc.), injection of code or data into specific files and/or via specific methods, etc. It is to be understood that these are simply examples of the types of behaviors that can be detected by the behavior detecting module 309. Which specific behaviors to detect varies between embodiments, and comprises a design choice. It is to be understood that in this context the behavior detecting module 309 does not detect behaviors of interest in order to determine whether an application 303 being monitored is malicious, but instead to create a behavior based signature 301 that can be used subsequently to identify instances of the malicious application 303.

Once the application monitoring module 307 has monitored a malicious application 303 and the behavior detecting module 309 has detected behaviors of interest executed thereby, a signature creating module 311 creates a behavior based signature 301 representing the detected behaviors. The specific format to use for the behavior based signature 301 is a variable design parameter. In one embodiment, a bit-field is used, in which the value of each bit signifies whether the malicious application 303 performed a given behavior. Various conventional formats for representing specific data can be used to create behavior based signatures 301, and the implementation mechanics of the use of such conventional formats for this specific purpose within the context of the present invention will be readily apparent to those of ordinary skill in the relevant art in light of this disclosure. For example, combinations or numerical values of multiple bits can be used to represent whether or not the malicious application 303 performs various behaviors.

In some embodiments, the signature creating module 311 creates a behavior based signature 301 that reflects not only which behaviors the malicious application 303 performs, but further identifies one or more series of behaviors 303, performed in sequence and/or in a specific order. For example, the behavior detecting module 309 could detect that the malicious application 303 executes behaviors A, B, C and D (in any order, or in that specific order). In such cases, the signature creating module 311 can create a behavior based signature 301 that indicates that the malicious application 303 performs this series of behaviors. For example, the signature creating module 311 can use multiple bits of a bit-field to so indicate. The identification of a series of behaviors 303 by a behavior based signature 301 can be as specific and detailed as desired (e.g., a behavior based signature 301 could identify that the corresponding malicious application 303 performs a long series of actions on specific data in a specific order). In addition, the application monitoring module 307 can note characteristics of the file storing the malicious application 303 itself, such as file name characteristics (e.g., eight random characters followed by .exe, rough size, etc.). The signature creating module 311 can use this data in the creation of behavior based signatures 301 as well. It is to be understood that just as the signature creating module 311 can create behavior based signatures 301 identifying malicious applications 303, so too can the signature creating module 311 create behavior based signatures 301 identifying non-malicious applications 305.

In addition, in some embodiments, a list creating module 313 creates black-lists 315 and/or white-lists 317 of behavior based signatures 301. A black-list 315 comprises a list of behavior based signatures 301 identifying malicious applications 303, including, for example, malicious applications 303 belonging to an application family or being of an application type known to be capable of spoofing or otherwise bypassing other methods of detection of malware. A white-list 317 comprises a list of behavior based signatures 301 identifying non-malicious applications 305, including, for example, non-malicious applications 305 belonging to an application family or being of an application type known to be subject to being falsely identified as malicious by other methods of malware detection, such as heuristic analysis.

Once behavior based signatures 301 (and, optionally, black-lists 315 and/or white-lists 317 of behavior based signatures 301) are created, they can be used by a malware detecting module 319 to determine if applications are malicious applications 303 or non-malicious applications 305. Although the malware detecting module 319 is illustrated as being a part of the behavior based signature system 101, it is to be understood that the functionality of the malware detecting module 319 can be separately instantiated, for example as part of a computer security system running on one or more servers 105 and/or clients 103. Where the functionality of the malware detecting module 319 resides on one or more computer systems 210 separate from that of the behavior based signature system 101, the behavior based signature system 101 can transmit behavior based signatures 301 (and optionally black-lists 315 and/or white-lists 317) to the remote instantiation(s) of the malware detecting module 319.

The malware detecting module 319 runs applications, and uses the functionality of the monitoring module 307 and behavior detecting module 309 described above to monitor the running applications and detect executed behaviors. The malware detecting module 319 compares detected behaviors of the running application to those indicated by one or more behavior based signatures 301 (for example, those in a black-list 315 and/or white-list 317). Depending upon whether the detected behaviors match a behavior based signature 301, the malware detecting module 319 determines whether the application is malicious or non-malicious. How close of a correlation between the detected behaviors and a behavior based signatures 301 is sufficient to comprise a match is a variable design parameter. Typically, a high correlation would be utilized, but in some embodiments less than a 100% match between behaviors executed by the application and those represented in the behavior based signature 301 is sufficient for a conviction (e.g., 75%, 90%, 98%, etc.).

In some embodiments, behavior based signature 301 checking is used in combination with other malware detection methods to determine whether given applications are malicious or non-malicious. For example, behavior based signature 301 matching can be used in combination with heuristic analysis. In one embodiment, a heuristic conviction is ignored if the application matches a behavior based signature 301 of a known non-malicious application 305 (e.g., a behavior based signature 301 on a white-list 317). In a related embodiment, an application matching a behavior based signature 301 of a malicious application 303 (e.g., a behavior based signature 301 on a black-list 315) results in a conviction, even if the application is exonerated by a heuristic analysis. The functionality of these embodiments counteracts the uncertainty of heuristic analysis and other malware detection techniques.

Figure 4:
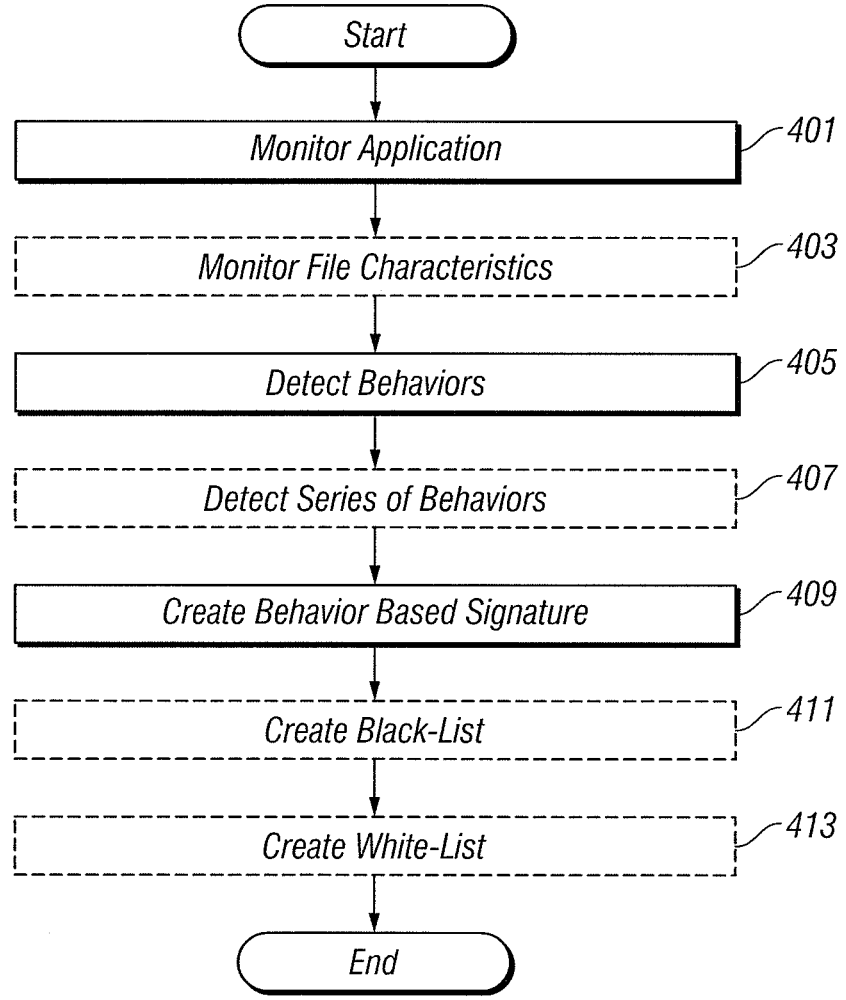
FIG. 4 is a flowchart illustrating steps for generating behavior based signatures, according to some embodiments.

FIG. 4 is a flowchart illustrating steps for generating behavior based signatures 301 (FIG. 3) for identifying applications, according to some embodiments. As illustrated in FIG. 4, the application monitoring module 307 (FIG. 3) of the behavior based signature system 101 (FIG. 1) monitors 401 an application 303 (FIG. 3) as it runs. In some embodiments, the application monitoring module also monitors 403 characteristics of the file storing the application. In some embodiments, the monitored application is a malicious application 303 (FIG. 3), whereas in others the monitored application is a non-malicious application 305 (FIG. 3). The behavior detecting module 309 (FIG. 3) of the behavior based signature system 101 (FIG. 1) detects 405 specific behaviors concerning the execution of the application. In some embodiments, the behavior detecting module 309 (FIG. 3) further detects 407 one or more series of specific behaviors concerning the execution of the application. The signature creating module 311 (FIG. 3) of the behavior based signature system 101 (FIG. 1) creates 409 a behavior based signature 301 (FIG. 3) representing detected behaviors concerning the execution of the application, such that the behavior based signature 301 (FIG. 3) can be used subsequently to identify instances of the application. In embodiments in which the application monitoring module also monitors 403 characteristics of the file storing the application, the signature creating module 311 (FIG. 3) can create 409 a behavior based signature 301 (FIG. 3) representing detected behaviors concerning the execution of the application and one or more monitored characteristic(s) of the file storing the application. In embodiments in which the behavior detecting module 309 (FIG. 3) further detects 407 one or more series of specific behaviors concerning the execution of the application, the signature creating module 311 (FIG. 3) can create 409 a behavior based signature 301 (FIG. 3) representing the one or more detected series of specific behaviors of the running application. In some embodiments, the list creating module 313 (FIG. 3) of the behavior based signature system 101 (FIG. 1) creates 411 a black-list 315 (FIG. 3) of behavior based signatures 301 (FIG. 3), each behavior based signature 301 (FIG. 3) on the black-list 315 (FIG. 3) identifying a malicious application 303 (FIG. 3). In some embodiments, the list creating module 313 (FIG. 3) creates 413 a white-list 317 (FIG. 3) of behavior based signatures 301 (FIG. 3), each behavior based signature 301 (FIG. 3) on the white-list 317 (FIG. 3) identifying a non-malicious application 305 (FIG. 3).

Figure 5:
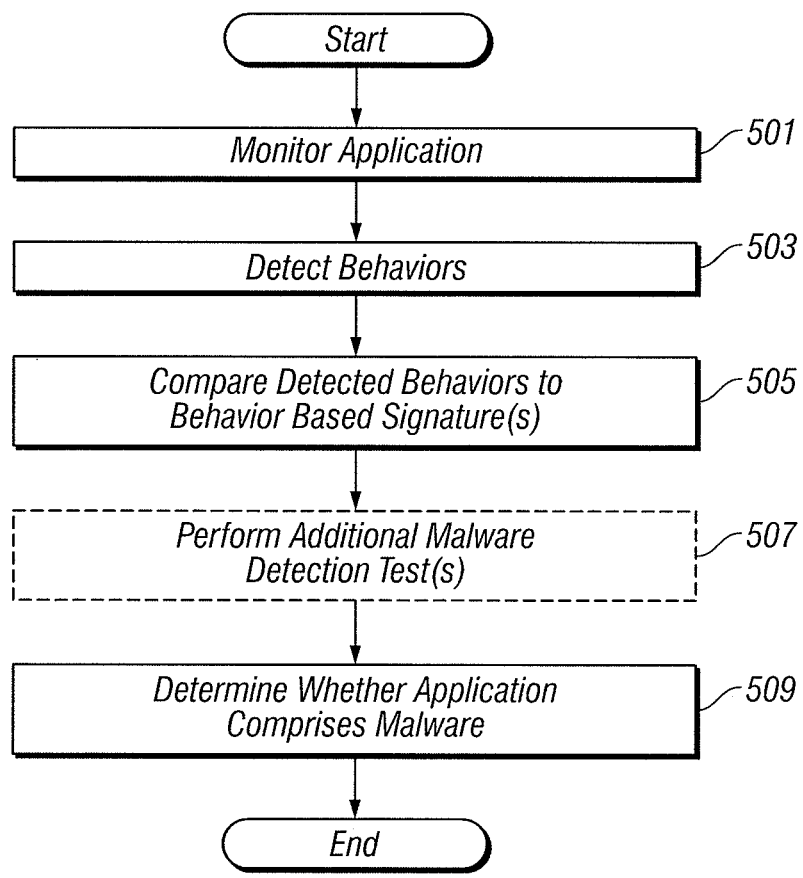
FIG. 5 is a flowchart illustrating steps for using behavior based signatures to identify malware, according to some embodiments.

FIG. 5 is a flowchart illustrating steps for using behavior based signatures to determine whether an application comprises malware, according to some embodiments. As illustrated in FIG. 5, the malware detecting module 319 (FIG. 3) monitors 501 an application 303 (FIG. 3) as it runs, and detects 503 specific behaviors concerning the execution of the application. The malware detecting module 319 (FIG. 3) compares 505 detected behaviors concerning the execution of the application to one or more behavior based signatures 301 (FIG. 3) (for example, those in a black-list 315 (FIG. 3) and/or white-list 317 (FIG. 3)). Responsive to whether the detected behaviors match a behavior based signature 301 (FIG. 3), the malware detecting module 319 (FIG. 3) can determine 509 whether or not the application comprises malware. In some embodiments, the malware detecting module 319 (FIG. 3) performs 507 at least one additional malware detection test, such as a heuristic analysis, on the application. In those embodiments, the malware detecting module 319 (FIG. 3) determines 509 whether the application comprises malware responsive to results of the comparing step and to the results of the additional malware detection test. For example, the malware detecting module 319 (FIG. 3) can perform 507 a heuristic analysis on the application in addition to the comparing step. In such a case, even where the heuristic analysis indicates that the application comprises malware, the malware detecting module 319 (FIG. 3) can still determine 509 that the application does not comprise malware where the comparing step so indicates.

Figure 6:
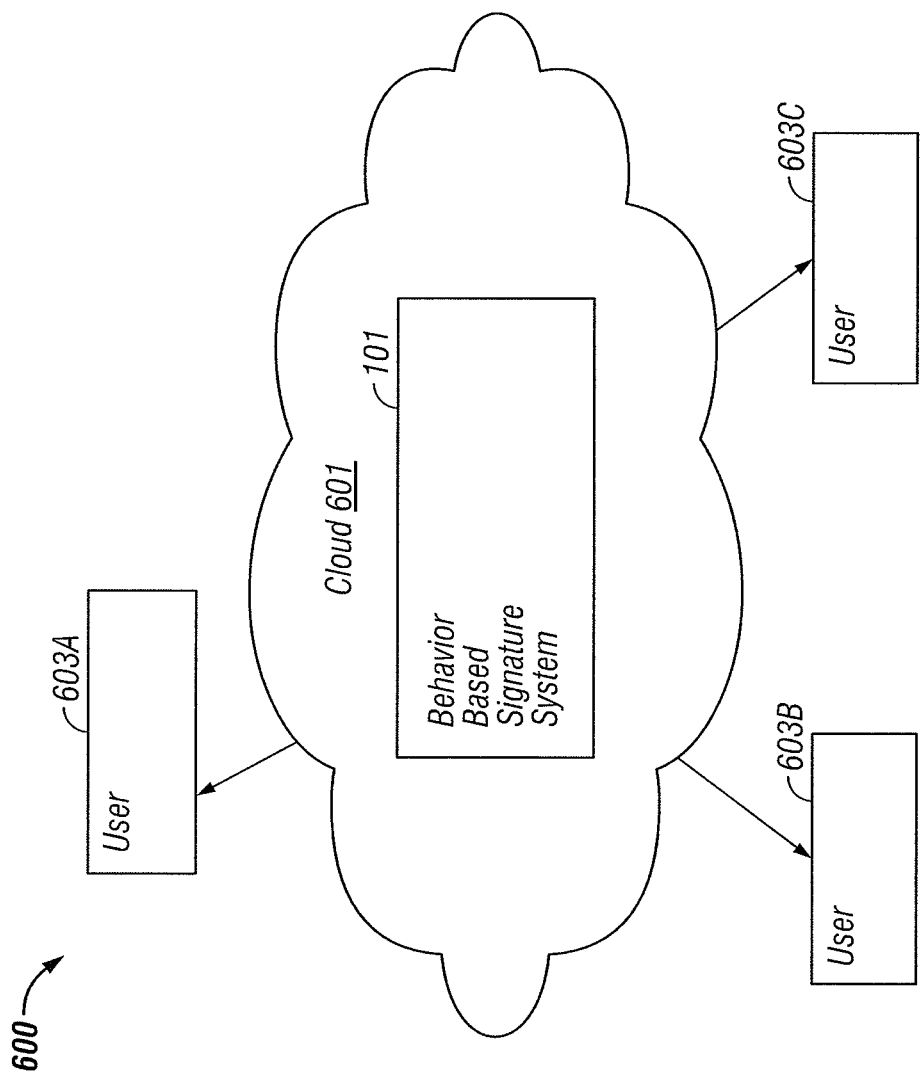
FIG. 6 is a block diagram of a behavior based signature system being provided as a service within a cloud computing environment, according to some embodiments.

FIG. 6 illustrates an embodiment in which the behavior based signature system 101 is provided as a service within a cloud computing environment 600. In cloud computing, dynamically scalable resources are provided to users 603 as a service over a cloud 601, which is typically the Internet or another large network 107. Cloud computing provides infrastructure and functionality as a service, mapping resources to individual users 603 based on their real-time computing needs. Cloud computing services are typically provided to multiple users 603 from one or more servers 105, accessed from a web browser or other interface, while the application(s) and corresponding data are stored on the servers 105. Users 603 need not have knowledge of the underlying technology infrastructure "in the cloud" that supports them.

In a cloud computing context, multiple users 603 can access the behavior based signature system 101 via the cloud 601 to facilitate the generation of behavior based signatures 301, and to facilitate the use of behavior based signatures 301 in malware detection. The cloud instantiated behavior based signature system 101 can generate behavior based signatures 301 for malicious applications 303 and/or non-malicious applications 305 on computer systems 210 of individual users 603, and optionally add them to a global black-list 315 and/or white-list 317 stored on the cloud 601. The cloud instantiated behavior based signature system 101 can also use behavior based signatures 301 to perform malware detection on computer systems 210 of individual users 603. The behavior based signatures 301 used in these cloud based operations can be local to the computer systems 210 of the individual users 603 and/or global to the cloud 601.

As will be understood by those familiar with the art, the claimed subject matter may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the claimed subject matter or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for generating behavior based signatures for identifying applications, the method comprising the steps of:

monitoring, by a computer, a non-malicious instance of an application as it executes;

detecting, by a computer, specific behaviors concerning how the application interacts with critical systems;

creating, by a computer, a behavior based signature representing detected behaviors concerning the execution of the application;

subsequently identifying an instance of the application as malicious based on the behavior based signature of the non-malicious instance;

monitoring a second application as it executes;
detecting specific behaviors concerning the execution of the second application;
comparing detected behaviors concerning the execution of the second application to at least one behavior based signature;
performing a heuristic analysis on the second application to determine whether the second application comprises malware; and
responsive to the comparing step and the heuristic analysis indications, determining whether the second application comprises malware.

2. The method of claim 1 wherein detecting, by a computer, specific behaviors concerning the execution of the application further comprises detecting, by a computer, at least one behavior from a group of behaviors consisting of:
a load point used by the application, network usage of the application, at least one protocol used by the application, at least one internet protocol address accessed by the application, at least one port used by the application, frequency of network transmission by the application, size of network transmission by the application, content of network transmission by the application, destination of network transmission by the application, source of network transmission by the application, frequency of file system access by the application, target of file system access by the application, frequency of modifications to file system by the application, target of modifications to file system by the application, content of modifications to file system by the application, registry modifications by the application, critical system area modifications by the application, critical system area access by the application, critical system file access by the application, critical system file modification by the application, critical directory access by the application, critical directory modification by the application, and content injection by the application.

3. The method of claim 1 further comprising:
detecting, by a computer, at least one series of specific behaviors concerning the execution of the application; and
creating, by a computer, a behavior based signature representing at least the at least one detected series of specific behaviors of the running application, such that the behavior based signature can be used subsequently to identify instances of the application.

4. The method of claim 1 further comprising:
monitoring, by a computer, at least one characteristic of a file storing the application; and
creating, by a computer, a behavior based signature representing detected behaviors concerning the execution of the application and the at least one characteristic of the file storing the application, such that the behavior based signature can be used subsequently to identify instances of the application.

5. The method of claim 1 further comprising:
creating a black-list of behavior based signatures, each behavior based signature on the black-list identifying a malicious application.

6. The method of claim 1 further comprising:
creating a white-list of behavior based signatures, each behavior based signature on the white-list identifying a non-malicious application.

7. The method of claim 1 further comprising:
responsive to the heuristic analysis indicating that the second application comprises malware and to the comparing step indicating that the second application does not comprise malware, determining, by a computer, that the second application does not comprise malware.

8. The method of claim 1 further comprising:
responsive to the heuristic analysis indicating that the second application does not comprise malware and to the comparing step indicating that the second application does comprise malware, determining, by a computer, that the second application does comprise malware.

9. The method of claim 1, wherein subsequently identifying the instance of the application as malicious comprises:
responsive to being unable to identify the instance of the application as non-malicious, identifying the instance of the application as malicious.

10. At least one non-transitory computer readable storage medium for generating behavior based signatures for identifying applications, the at least one computer readable storage medium comprising:
program code for monitoring a non-malicious instance of an application as it executes;
program code for detecting specific behaviors concerning how the application interacts with critical systems;
program code for creating a behavior based signature representing detected behaviors concerning the execution of the application;
program code for subsequently identifying a malicious instance of the application based on the behavior based signature of the non-malicious instance;
program code for monitoring a second application as it executes;
program code for detecting specific behaviors concerning the execution of the second application;
program code for comparing detected behaviors concerning the execution of the second application to at least one behavior based signature;
program code for performing a heuristic analysis on the second application to determine whether the second application comprises malware; and
program code for, responsive to the comparing step and the heuristic analysis indications, determining whether the second application comprises malware.

11. The computer readable storage medium of claim 10 further comprising:
program code for detecting at least one series of specific behaviors concerning the execution of the application; and
program code for creating a behavior based signature representing at least the at least one detected series of specific behaviors of the running application, such that the behavior based signature can be used subsequently to identify instances of the application.

12. The computer readable storage medium of claim 10 further comprising:
program code for creating a black-list of behavior based signatures, each behavior based signature on the black-list identifying a malicious application.

13. The computer readable storage medium of claim 10 further comprising:
program code for creating a white-list of behavior based signatures, each behavior based signature on the white-list identifying a non-malicious application.

14. The computer readable storage medium of claim 10 further comprising:
program code for, responsive to the heuristic analysis indicating that the second application comprises malware and to the comparing step indicating that the second application does not comprise malware, determining that the second application does not comprise malware.

15. The computer readable storage medium of claim 10 further comprising:
program code for, responsive to the heuristic analysis indicating that the second application does not comprise malware and to the comparing step indicating that the second application does comprise malware, determining that the second application does comprise malware.

16. The computer readable storage medium of claim 10, wherein program code for subsequently identifying the instance of the application as malicious comprises:
program code for, responsive to being unable to identify the instance of the application as non-malicious, identifying the instance of the application as malicious.

17. The computer readable storage medium of claim 10 wherein the program code for detecting specific behaviors concerning how the application interacts with critical systems further comprises program code for detecting at least one behavior from a group of behaviors consisting of:
a load point used by the application, network usage of the application, at least one protocol used by the application, at least one internet protocol address accessed by the application, at least one port used by the application, frequency of network transmission by the application, size of network transmission by the application, content of network transmission by the application, destination of network transmission by the application, source of network transmission by the application, frequency of file system access by the application, target of file system access by the application, frequency of modifications to file system by the application, target of modifications to file system by the application, content of modifications to file system by the application, registry modifications by the application, critical system area modifications by the application, critical system area access by the application, critical system file access by the application, critical system file modification by the application, critical directory access by the application, critical directory modification by the application, and content injection by the application.

18. The computer readable storage medium of claim 10 further comprising:
program code for monitoring at least one characteristic of a file storing the application; and
program code for creating a behavior based signature representing detected behaviors concerning the execution of the application and the at least one characteristic of the file storing the application, such that the behavior based signature can be used subsequently to identify instances of the application.

19. A computer system for generating behavior based signatures for identifying applications, the computer system comprising:
system memory;
an application monitoring module residing in the system memory, the application monitoring module being programmed to monitor a non-malicious instance of an application as it executes;
a behavior detecting module residing in the system memory, the behavior detecting module being programmed to detect specific behaviors concerning how the application interacts with critical systems;
a signature creating module residing in the system memory, the signature creating module being programmed to create a behavior based signature representing detected behaviors concerning the execution of the application;
a malware detecting module residing in the system memory, the malware detecting module being programmed to subsequently identify a malicious instance of the application based on the behavior based signature of the non-malicious instance;
the application monitoring module being further programmed to monitor a second application as it executes;
the behavior detecting module being further programmed to detect specific behaviors concerning the execution of the second application; and
the malware detecting module being further programmed to compare detected behaviors concerning the execution of the second application to at least one behavior based signature, to perform a heuristic analysis on the second application, and to determine whether the second application comprises malware, responsive to the comparing and to heuristic analysis indications.

20. The computer system of claim 19 further comprising:
a list creating module residing in the system memory, the list creating module being programmed to create a black-list of behavior based signatures, each behavior based signature on the black-list identifying a malicious application.

* * * * *